US009480091B2

(12) United States Patent
Luo et al.

(10) Patent No.: US 9,480,091 B2
(45) Date of Patent: Oct. 25, 2016

(54) METHOD, NETWORK ELEMENT AND UE ACHIEVING IDENTIFIER AND LOCATION SEPARATION AND INTERFACE IDENTIFIER ALLOCATION

(71) Applicant: ZTE Corporation, Shenzhen (CN)

(72) Inventors: Wen Luo, Shenzhen (CN); Jiong Shen, Shenzhen (CN); Mo Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 201 days.

(21) Appl. No.: 14/358,481

(22) PCT Filed: Oct. 30, 2012

(86) PCT No.: PCT/CN2012/083739
§ 371 (c)(1),
(2) Date: May 15, 2014

(87) PCT Pub. No.: WO2013/071819
PCT Pub. Date: May 23, 2013

(65) Prior Publication Data
US 2014/0328300 A1    Nov. 6, 2014

(30) Foreign Application Priority Data

Nov. 15, 2011   (CN) .......................... 2011 1 0362003

(51) Int. Cl.
| H04W 4/00 | (2009.01) |
| H04W 76/02 | (2009.01) |
| H04W 8/08 | (2009.01) |
| H04L 29/12 | (2006.01) |
| H04W 72/04 | (2009.01) |
| H04W 8/26 | (2009.01) |
| H04W 12/06 | (2009.01) |

(52) U.S. Cl.
CPC .......... *H04W 76/021* (2013.01); *H04L 61/103* (2013.01); *H04L 61/2084* (2013.01); *H04W 8/08* (2013.01); *H04W 72/0406* (2013.01); *H04L61/2007* (2013.01); *H04L 61/6004* (2013.01); *H04L 61/6068* (2013.01); *H04W 8/26* (2013.01); *H04W 12/06* (2013.01)

(58) Field of Classification Search
None
See application file for complete search history.

(56) References Cited

U.S. PATENT DOCUMENTS

2010/0008507 A1 * 1/2010 Galante ................ H04L 63/068
380/278
2010/0158029 A1   6/2010 Choo et al.

FOREIGN PATENT DOCUMENTS

CN   101459698 A   6/2009
CN   102025608 A   4/2011
(Continued)

OTHER PUBLICATIONS

International Search Report of PCT/CN2012/083739 dated Feb. 14, 2013.
Splitting Mechanism for IP into Identifier and Locator in NGN, ISBN 978-89-5519-131-8 93560, Feb. 12-14, 2007.
(Continued)

*Primary Examiner* — Chi H Pham
*Assistant Examiner* — Fahmida Chowdhury
(74) *Attorney, Agent, or Firm* — Banner & Witcoff, Ltd.

(57) ABSTRACT

The embodiments of the present invention disclose a method, network element and terminal of achieving identity and location separation and interface identifier allocation. The method of achieving an identity and location separation network includes: an EPS network side network element acquiring an Access Identifier (AID) of a User Equipment (UE), and transmitting the acquired AID to the UE; a Packet Data Network Gateway (P-GW) to which the UE is attached allocating a subnet prefix for the UE, and transmitting the subnet prefix to the UE; and the UE combining into an IPv6 address using the AID as an interface identifier part of the IPv6 address and the subnet prefix as a subnet prefix part of the IPv6 address, and using the IPv6 address to configure the IPv6 address of the UE itself.

17 Claims, 5 Drawing Sheets

(56) References Cited

FOREIGN PATENT DOCUMENTS

| | | |
|---|---|---|
| CN | 102196402 A | 9/2011 |
| WO | 2011/032478 A1 | 3/2011 |
| WO | 2011/032479 A1 | 3/2011 |
| WO | 2011/110025 A1 | 9/2011 |

OTHER PUBLICATIONS

3GPP TSG CT WG1 Meeting, #50, Sophia Antipolis, France, Nov. 5-9, 2007, C1-073121, Source, Qualcomm Europe, Title IPv6 Stateless autoconfiguration, Agenda Item 9-2, Document for Discussion and Approval.

* cited by examiner

METHOD, NETWORK ELEMENT AND UE ACHIEVING IDENTIFIER AND LOCATION SEPARATION AND INTERFACE IDENTIFIER ALLOCATION

TECHNICAL FIELD

The patent document relates to the field of mobile communication technology, and in particular, to a method of achieving identity and location separation, a method for allocating an interface identifier, a network element, and a User Equipment (UE).

BACKGROUND OF THE RELATED ART

The $3^{rd}$ Generation Partnership Project (3GPP for short) Evolved Packet System (EPS for short) is comprised of the Evolved Universal Terrestrial Radio Access Network (E-UTRAN for short), the Mobility Management Entity (MME for short), the Serving Gateway (S-GW), the Packet Data Network Gateway (the P-GW or PDN GW for short), the Home Subscriber Server (the HSS for short), the 3GPP Authentication, Authorization and Accounting server (AAA for short) server, the Policy and Charging Rules Function (PCRF for short) entity and other supporting nodes. FIG. 1 is a diagram of architecture of a related EPS system. As shown in the figures, the MME is responsible for control plane related works such as mobility management, processing of non access stratum signaling, the management of user mobility management context; the S-GW is an access gateway device which is connected to the E-UTRAN, transfers data between the E-UTRAN and the P-GW, and is responsible for buffering paging wait data.

The P-GW is a border gateway between the EPS and a Packet Data Network (PDN for short) network, and is responsible for functions such as access of the PDN and data forwarding between the EPS and the PDN etc. The P-GW is responsible for allocating an IP address to the terminal, and is also a mobility anchor of the terminal at the same time. No matter where the terminal moves, a data packet (an IP packet) received and transmitted between the terminal and the outside always needs to be forwarded via the P-GW. Such mobility management scheme will result in problem of roundabout routing recognized in the industry. That is, when a distance between the terminal and a communication Correspondent Node (CN) thereof is very close and the terminal is far from the anchor of the terminal (P-GW), the data packet received and transmitted between the terminal and the CN also must be routed via the anchor.

The industry currently proposes a series of new mobility management technologies based on a user identity and location separation technology, which can solve the above problem of routing roundabout. FIG. 2 illustrates the architecture of an identity and location separation based network. In the architecture of the network, the network is divided into access networks and a backbone network without overlap in a topology, wherein, the access networks are located at the edge of the backbone network, and are responsible for the access of all terminals, and the backbone network is responsible for routing and forwarding of data packet between access terminals. An identity identifier of a terminal user is represented as Access Identifier (AID). No matter in where the terminal accesses the network, and no matter how the terminal moves in the network, the access identifier remains unchanged; and the location identifier of the terminal is represented as Routing Identifier (RID), and is allocated by the network for use in the backbone network.

It should be illustrated that different architecture based on identity and location separation may have different names, but the substances thereof are the same. In addition, the terminal may be one or more of a mobile terminal, a fixed terminal, and a nomadic terminal, such as a mobile phone, a fixed-line telephone, a computer and a server etc.

In the architecture of the network illustrated in FIG. 2, the access network is used to provide a layer-two (a physical layer and a link layer) access means for the terminal and maintain a physical access link between the terminal and an Access Service Router (ASR). Primary network elements of the backbone network include an ASR, an Identity Location Register (ILR) and a Common Router (CR).

The ASR is a border router of the backbone network, and its function is to allocate a RID to the terminal, locally maintain a mapping relationship between the AID and the RID of the terminal, and update the RID of the terminal stored by the ILR; and when a data packet is transmitted from the terminal to a CN of the terminal, the RID of the CN is inquired based on the AID of the CN from the ILR, and the data packet is forwarded to the CN based on the RID of the CN etc. The terminal needs to access to the backbone network via the ASR, and the RID allocated by the above ASR to the terminal includes address information of the ASR, or an address pointing to the ASR. After the ASR receives the data packet transmitted by the terminal to the CN, the RID of the terminal and the RID of the CN are used to perform tunneling encapsulation on the data packet and transmit it to the CN; and when the ASR of the CN receives the data packet after being performed with the tunneling encapsulation, the RID tunneling encapsulation of an outer layer is stripped, and the data packet is then transmitted to the CN. The CR is a general router widely deployed in the backbone network, for example, a core router therein, and its function is to select a route according to the RID in the data packet, and forward a data packet with the RID as a destination address. The ILR is used to store and maintain mapping information from the identity identifier to the location identifier of the terminal, i.e., a mapping relationship between the AID and the RID of the terminal, and process the registration, deregistration and inquiry of the terminal location. It should be pointed out that the backbone network may further comprise an Internet Service Router (ISR) and which is an interface to a traditional IP network, an ASR and an ILR for achieving internet interconnection between an identity and location separation network and a traditional IP network.

In order to be compatible with an existing IP network, the above AID is generally represented by selecting a format of an IP address for use, for transparent support for the application program and terminal devices, i.e., the socket of the application program is still connected to the IP address, and needs not to be changed. But in an actual semantics, the IP address as the AID merely expresses identity information of one terminal, and does not express the location information of the terminal, that is, although the AID takes a form of an IP address, it is not a routable IP address in a traditional sense. As described above, the RID is used to express the location information of the terminal. In order to achieve normal forwarding of a packet, when the ASR receives a data packet transmitted by a terminal to a CN, the ASR needs to be aware of the RID of the CN and perform tunneling encapsulation on the data packet. The data packet after being performed with tunneling encapsulation possesses two IP headers, a source address of an outer IP header is a RID of the terminal, and a destination address is a RID of the CN; a source address of an inner IP header is an AID of the terminal, and a destination address is an AID of the CN. Thus, the interconnection between the terminal and the CN can be achieved.

As described above, the mobility related method based on an identity and location separation technology depends on tunneling encapsulation on the data packet, and needs to perform an IP packet encapsulation again on the data packet transmitted by the terminal to the CN, thus increasing a length of the header of the packet and resulting in overhead increase of the backbone network. Particularly when such mobility management technology is applied in the above EPS network, since the EPS itself supports and also prefers to use the Internet Protocol Version 6 (IPv6), such use of the above tunneling encapsulation mechanism will further aggravate resource consumption of the backbone network and increase the cost of the backbone network.

SUMMARY OF THE INVENTION

The embodiments of the present invention provide a method of achieving identity and location separation, which reduces the resource consumption of the backbone network.

The embodiments of the present invention provide a method of achieving an identity and location separation network, which is suitable to be applied in an EPS network of the identity and location separation technology, the method comprising:

an EPS network side network element acquiring an Access Identifier (AID) of a User Equipment (UE), and transmitting the acquired AID to the UE;

a Packet Data Network Gateway (P-GW) to which the UE is attached allocating a subnet prefix for the UE, and transmitting the subnet prefix to the UE; and the UE combining into an IPv6 address using the AID as an interface identifier part of the IPv6 address and the subnet prefix as a subnet prefix part of the IPv6 address, and using the IPv6 address to configure the IPv6 address of the UE itself.

Preferably, the EPS network side network element acquiring an AID of a UE comprises: the EPS network side network element acquiring the AID of the UE by inquiring an Identity Location Register (ILR) or an authentication and authorization server according to an International Mobile Subscriber Identification Number (IMSI) of the UE.

Preferably, the authentication and authorization server comprises any one of an Authentication, Authorization and Accounting (AAA) server, a home location register and a home subscriber server.

Preferably, the EPS network side network element comprises any one of a Mobility Management Entity (MME), a P-GW and a Serving Gateway (S-GW).

Preferably, the method further comprises: when the UE transmits a data packet to a Correspondent Node (CN), using the combined IPv6 address as a source address of the data packet, and using the AID of the CN as the interface identifier part of a destination address of the data packet; and after the P-GW to which the UE is attached receives the data packet transmitted by the UE, inquiring to obtain a Routing Identifier (RID) of the CN, and after the subnet prefix part of the destination address of the data packet is substituted with the RID, transmitting the data packet to an IP network.

Preferably, the method further comprises:

when the P-GW to which the UE is attached receives the data packet transmitted to the UE, the P-GW substituting the subnet prefix of the destination address of the data packet with the subnet prefix allocated by the P-GW to the UE, and transmitting the data packet to the UE.

Preferably, the EPS network side network element is a Mobility Management Entity (MME), and the MME transmitting the acquired AID to the UE comprises: the MME transmitting the acquired AID to the UE in a process of establishing a bearer for the UE or attaching the UE or the UE requesting a PDN connection.

Preferably, the MME transmitting the acquired AID to the UE in a process of establishing a bearer for the UE comprises: in a process of establishing a bearer for the UE, the MME carrying the AID of the UE acquired by the MME inquiring the ILR or the authentication and authorization server according to the IMSI of the UE before establishing a bearer for a terminal in an activate default EPS bearer context request message to be transmitted to the UE.

Preferably, the MME transmitting the acquired AID to the UE in a process of attaching the UE comprises: when an attach request transmitted by the UE or a Create Session Response message returned by a Serving Gateway (S-GW) is received, acquiring the AID of the UE by inquiring the ILR or the authentication and authorization server according to the IMSI of the UE, and carrying the acquired AID of the UE in an attach accept message to be transmitted to the UE.

Preferably, the MME transmitting the acquired AID to the UE in a process of the UE requesting a PDN connection comprises: when the MME receives a PDN connectivity request message transmitted by the UE or a Create Session Response message returned by a S-GW, acquiring the AID of the UE by inquiring the ILR or the authentication and authorization server according to the IMSI of the UE, and carrying the acquired AID of the UE in a PDN connectivity accept message to be transmitted to the UE.

Preferably, the EPS network side network element is a P-GW, and the P-GW transmitting the acquired AID to the UE comprises: the P-GW transmitting the acquired AID to the UE in a process of attaching the UE or the UE requesting a PDN connection.

Preferably, the EPS network side network element is a P-GW, and the EPS network side network element acquiring the AID of the UE and transmitting the acquired AID to the UE comprises: in a process of attaching the UE or the UE requesting a PDN connection, when the P-GW receives a Create Session Request message, the P-GW acquiring the AID of the UE by inquiring the ILR or the authentication and authorization server according to the IMSI of the UE, and carrying the AID of the UE in a Create Session Response message returned to the S-GW to be transmitted to the UE through the S-GW and the MME.

Preferably, the network side network element is the S-GW, and the S-GW transmitting the acquired AID to the UE comprises: in a process of attaching the UE or the UE requesting a PDN connection, the S-GW transmitting the acquired AID to the UE.

Preferably, the EPS network side network element is a S-GW, and the EPS network side network element acquiring the AID of the UE and transmitting the acquired AID to the UE comprises: in a process of attaching the UE or the UE requesting a PDN connection, when the S-GW receives a Create Session Request message transmitted by the MME or a Create Session Response message transmitted by the P-GW, the S-GW acquiring the AID of the UE by inquiring the ILR or the authentication and authorization server according to the IMSI of the UE, and carrying the AID of the UE in a Create Session Response message returned to the MME to be transmitted to the UE through the MME.

Preferably, the method further comprises: after determining the P-GW to which the UE is attached, the EPS network side network element allocating a Routing Identifier (RID) for the UE, wherein, the RID is a subnet prefix of an IPv6 address pointing to the P-GW; and the EPS network side network element transmitting the RID of the UE to the ILR, and the ILR storing a mapping relationship between the AID and the RID of the UE.

Preferably, the Packet Data Network Gateway (P-GW) to which the UE is attached allocating the subnet prefix for the UE comprises: the P-GW allocating the RID allocated by the EPS network side network element to the UE as the subnet prefix to the UE.

Preferably, the UE using the AID as an interface identifier part of an IPv6 address comprises:

the UE using the AID as a part of the interface identifier part of an IPv6 address, generating the other part of the interface identifier part, and combining the two parts into the interface identifier part of the IPv6 address.

The embodiments of the present invention further provide a method of allocating an interface identifier to a terminal, which reduces the resource consumption of the backbone network.

A method of allocating an interface identifier to a UE in an EPS network is provided, comprising:

an EPS network side network element locally allocating or acquiring the interface identifier of the UE from subscription information of the UE, and transmitting the acquired interface identifier to the UE.

Preferably, the EPS network side network element comprises any one of a Mobility Management Entity (MME), a Packet Data Network Gateway (P-GW) and a Serving Gateway (S-GW).

Preferably, the EPS network side network element is an MME, and the MME transmitting the acquired interface identifier to the UE comprises: the MME transmitting the acquired interface identifier to the UE in a process of establishing a bearer for the UE or attaching the UE or the UE requesting a PDN connection.

Preferably, the EPS network side network element is a P-GW, and the P-GW transmitting the acquired interface identifier to the UE comprises: in a process of attaching the UE or the UE requesting a PDN connection, the P-GW transmitting the acquired interface identifier to the UE.

Preferably, the network side network element is a S-GW, and the S-GW transmitting the acquired interface identifier to the UE comprises: in a process of attaching the UE or the UE requesting a PDN connection, the S-GW transmitting the acquired interface identifier to the UE.

The embodiments of the present invention further provide a network side network element for allocating an interface identifier to a terminal.

An EPS network side network element is provided, comprising an acquisition module and a first transmission module, wherein, the acquisition module is configured to acquire an Access Identifier (AID) of a terminal (UE); and the first transmission module is configured to transmit the AID acquired by the acquisition module to the UE.

Preferably, the EPS network side network element comprises any one of a Mobility Management Entity (MME), a Packet Data Network Gateway (P-GW) and a Serving Gateway (S-GW).

Preferably, when the EPS network side network element is a P-GW to which the UE is attached, the P-GW further comprises a subnet prefix allocation module and a second transmission module, wherein, the subnet prefix allocation module is configured to allocate a subnet prefix for the UE, and the second transmission module is configured to transmit the subnet prefix allocated by the allocation module to the UE.

Preferably, when the EPS network side network element is a P-GW to which the UE is attached, the P-GW further comprises a substitution module, which is configured to after receiving the data packet transmitted by the UE, inquire to obtain a RID of a Correspondent Node (CN) of the UE, and after the subnet prefix part of the destination address of the data packet is substituted with the RID, transmit the data packet to an IP network.

Preferably, the substitution module is further configured to, when receiving the data packet transmitted to the UE, substitute the subnet prefix of the destination address of the data packet with the subnet prefix allocated by the P-GW to the UE, and transmit the data packet to the UE.

Preferably, the acquisition module is configured to acquire the AID of the UE in the following way:

the acquisition module acquiring the AID of the UE by inquiring an ILR or an authentication and authorization server according to an International Mobile Subscriber Identification Number (IMSI) of the UE; or locally allocating the AID of the UE; or acquiring the AID of the UE from subscription information of the UE.

Preferably, the EPS network side network element is a Mobility Management Entity (MME), and the transmission module is configured to transmit the AID acquired by the acquisition module to the UE in the following way: the transmission module transmitting the AID acquired by the acquisition module to the UE in a process of establishing a bearer for the UE or attaching the UE or the UE requesting a PDN connection.

Preferably, the EPS network side network element is a P-GW, and the transmission module is configured to transmit the AID acquired by the acquisition module to the UE in the following way: the transmission module transmitting the AID acquired by the acquisition module to the UE in a process of attaching the UE or the UE requesting a PDN connection.

Preferably, the EPS network side network element is a S-GW, and the transmission module is configured to transmit the AID acquired by the acquisition module to the UE in the following way: the transmission module transmitting the AID acquired by the acquisition module to the UE in a process of attaching the UE or the UE requesting a PDN connection.

Preferably, the EPS network side network element further comprises a Routing Identifier (RID) allocation module and a third transmission module, wherein, the RID allocation module is configured to after the network element determines the P-GW to which the UE is attached, allocate a RID for the UE, wherein, the RID is a subnet prefix of an IPv6 address pointing to the P-GW; and the third transmission module is configured to transmit the RID of the UE to the ILR, which stores a mapping relationship between the AID and the RID of the UE.

The embodiments of the present invention provide a terminal, and the IPv6 address configured to the terminal can reduce the resource consumption of the backbone network during data transmission.

Provided is a terminal (UE), comprising a reception module and a configuration module, wherein, the reception module is configured to receive an Access Identifier (AID) of the UE transmitted by an EPS network side network element and receive a subnet prefix allocated by a P-GW to which the UE is attached; and the configuration module is configured to combine into an IPv6 address using the AID as an interface identifier part of the IPv6 address and the subnet prefix as a subnet prefix part of the IPv6 address, and use the IPv6 address to configure the IPv6 address of the UE itself.

Preferably, the configuration module is configured to use the AID as an interface identifier part of an IPv6 address in the following way:

using the AID as a part of the interface identifier part of an IPv6 address, generating the other part of the interface identifier part, and combining the two parts into the interface identifier part of the IPv6 address.

Preferably, the terminal further comprises a transmission module, configured to use the combined IPv6 address as a source address of the data packet and use the AID of a CN as an interface identifier part of a destination address of the data packet when the UE transmits a data packet to the Correspondent Node (CN).

With the method, network element or terminal according to the embodiments of the present invention, when data is transmitted between the terminal and a CN, there is no need to perform tunneling encapsulation on the data packet, which reduces the resource consumption of the backbone network and reduces the cost of the backbone network.

PREFERRED EMBODIMENTS OF THE PRESENT INVENTION

The IPv6 is the next generation of IP protocol designed by the Internet Engineering Task Force (IETF) for substituting the current version of IP protocol (IPv4). The global IPv6 unicast address (128-bit) is constituted by two logical parts, i.e., a subnet prefix and an Interface Identifier (ID). The subnet prefix of first N bits (for example, the first 64 bits) addresses to a local area network where the host is located, and an interface ID of the last 128-N bits (for example, the last 64 bits) locates to a specific host interface.

As described above, the mobility management technology based on the identity and location separation principle may be applied in the EPS. At this time, the P-GW has the function of the above ASR, and it needs to deploy the ILR in the core network of the EPS at the same time. A method is proposed herein. With the feature that the IPv6 is constituted by two parts, i.e., the subnet prefix and interface identifier, the AID of the terminal and the RID of the terminal constitute the IPv6 address by the AID taking a form (format) of the above interface identifier and the RID taking a form (format) of the above subnet prefix, and the IPv6 address is used to configure the IPv6 address of the UE itself, so that the identity identifier and the location identifier of the terminal can be carried by the same IPv6 address, so as to solve the problem of increased overhead of the backbone network (core network) resulting from the dependence of the tunneling encapsulation for achieving identity and location separation in the existing technology.

Figure 1:
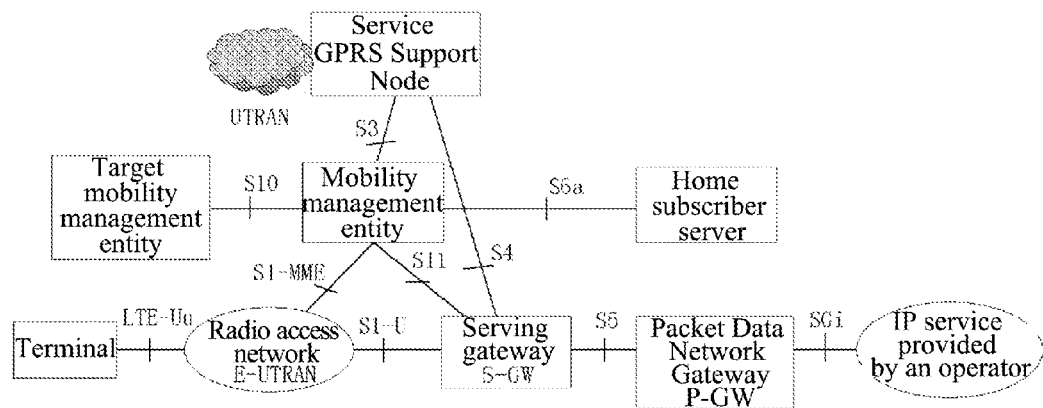
FIG. 1 is a diagram of architecture of a related EPS system.
Figure 2:
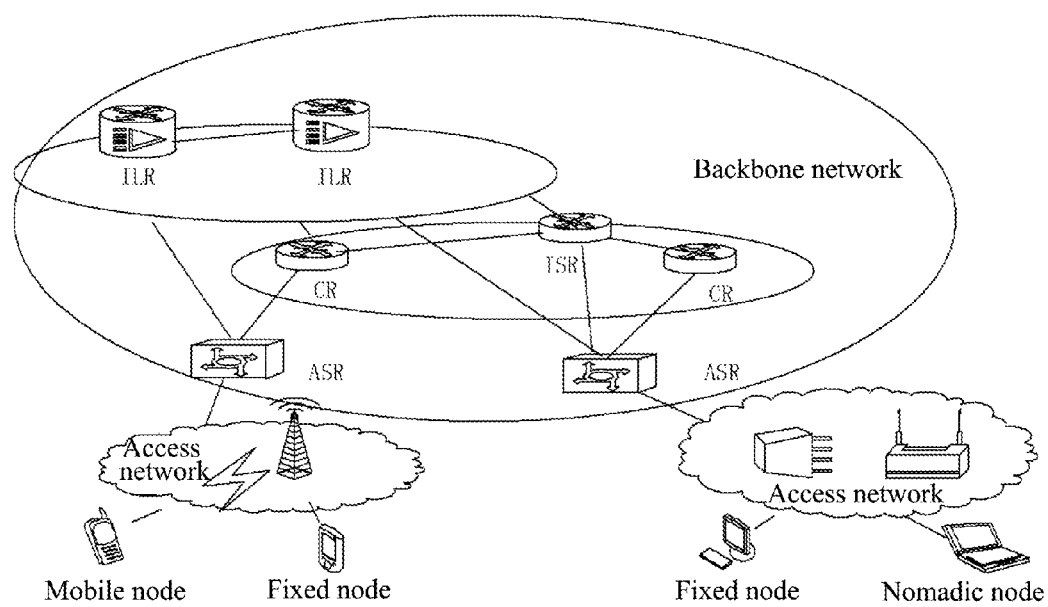
FIG. 2 is a diagram of architecture of an identity and location separation based network.
Figure 3:
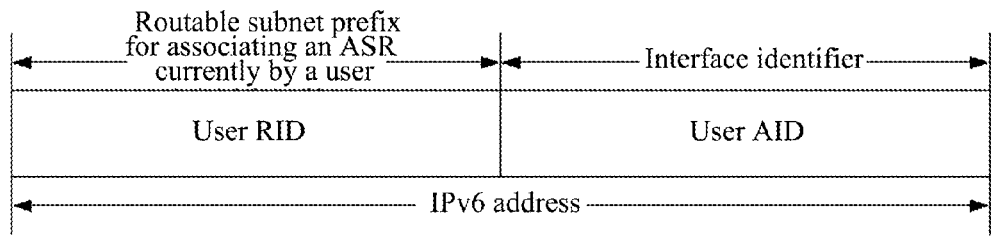
FIG. 3 is a diagram of a complete IPv6 address constituted by a RID and an AID.

The embodiments will be described below by taking a subnet prefix being 64 bits (the first 64 bits of the 128-bit IPv6 address) and an interface ID also being 64 bits (the last 64 bits of the 128-bit IPv6 address) as an example. When the terminal (also referred to as a UE) is attached to the network, the network side network element allocates a routing identifier RID to the terminal, wherein the RID is represented in a form of one subnet prefix (for example, the first 64 bits of the 128-bit IPv6 address). According to the RID (subnet prefix), other routers in the backbone network can locate the ASR to which the UE is attached; each terminal is further configured with one AID, which is generally determined when the a user of the terminal subscribes with operators and opens an account, and is an invariable unique identifier, but the AID is expressed using a format of an interface identifier (interface ID) part of the IPv6 address (for example, the last 64 bits of the 128-bit IPv6 address), which is different from being expressed using a format of an IPv6 (applied in the IPv6 environment) address in the related art. As shown in FIG. 3, the above RID and the AID may constitute a complete IPv6 address.

Figure 4:
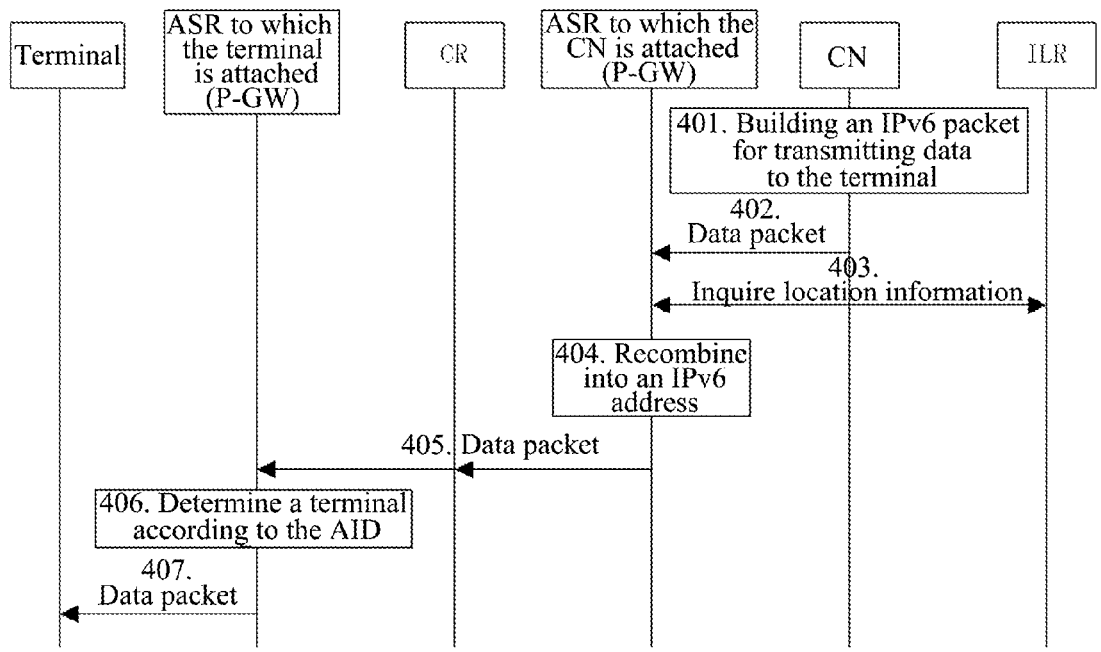
FIG. 4 is a flowchart of interconnection between terminals according to an embodiment of the present invention.

FIG. 4 illustrates a procedure of interconnection between a UE and a CN thereof. The CN of the UE may be another UE, or another entity (for example, a server etc.) in the network. The flowchart specifically comprises the following steps.

In step 401, the CN of the UE transmits a data packet to the UE. Firstly, it needs to build an IPv6 data packet and fill in a destination address (the destination address is an IPv6 address of the UE) and a source address (the source address is an IPv6 address of the CN) of the IPv6 address.

Wherein, the last 64 bits of the destination address (interface ID) is filled with an AID of the UE (i.e., the AID of the UE is used as an interface identifier of the destination address). That is, the filled destination address is not necessarily the IPv6 address currently configured by the UE, but the interface ID part in the destination address must be the AID of the UE. While the first 64 bits (subnet prefix) is random, for example, it may be a fixed value designated by an operator. Preferably, the CN may inquire the AID of the UE from the DNS through a domain name of the UE.

The source address is filled with an IPv6 address configured by the network to the CN when the CN access the network, wherein, the last 64 bits of the address (interface ID) is an AID of the CN itself, and the first 64 bits (subnet prefix) is a subnet prefix configured by the network to the CN.

It should be pointed out that as the RID is merely on the ASR (P-GW) for the terminal, it needs not to be downloaded to the UE. Therefore, the value of the subnet prefix part of the IPv6 address of the UE or the CN is not limited here, and it may not be the RID of the UE or the CN.

In step 402, the CN transmits the above data packet to an ASR (P-GW) connected to the CN, wherein, the ASR is referred to as an ASR-CN hereinafter;

In steps 403-404, the ASR-CN inquires a location identifier of the UE from the ILR, which comprises the ASR-CN transmitting the AID of the UE to the ILR, the ILR returning a RID of the UE to the ASR-CN, and the ASR-CN recombining into the above IPv6 packet after obtaining the RID of the UE. Specifically, the ASR-CN substitutes the destination address of the above IPv6 packet, i.e., substituting the first 64 bits thereof (subnet prefix) with the RID of the UE. Of course, the last 64 bits of the IPv6 address are still the AID of the UE, and in this case, the routing identifier RID and the access identifier AID of the UE are carried in the destination address at the same time;

in step 405, the ASR-CN transmits the recombined IPv6 packet to the backbone network, and according to the subnet prefix of the IPv6 packet (the first 64 bits, i.e., the RID of the UE), the CR in the backbone network may route the packet to the ASR (P-GW) to which the UE is attached in accordance with a routing mechanism of the IPv6, wherein, the ASR is referred to as an ASR-UE hereinafter;

the backbone network described here is used to be distinguished from an access network between the UE and the ASR-CN, and actually, the backbone network is an IP network, or may also be referred to as a Packet Data Network (PDN).

In steps 406-407, the ASR-UE determines a final receiver of the received IPv6 data packet according to the last 64 bits of the packet, i.e., the AID of the UE, and transmits the packet;

It should be pointed out that, preferably, before the ASR-UE transmits the above received IPv6 data packet to the UE, it also needs to check a subnet prefix of the destination address of the IPv6 data packet (i.e., the first 64 bits, which is the RID of the UE). Specifically, if the ASR-UE judges that the subnet prefix is a prefix allocated by the network to the UE when the UE accesses the network, the ASR-UE transmits the above data packet directly; and if the subnet prefix is not the prefix allocated by the network to the UE when the UE accesses the network, the ASR-UE also needs to substitute the destination address of the above IPv6 data packet, i.e., substituting the subnet prefix of the destination address with the subnet prefix allocated by the network to the UE when the UE accesses the network (the last 64 bits, i.e., the AID of the UE, remain unchanged), and then transmits the data packet.

The above procedure will be described below by taking a specific example. Assume that an AID of a UE is 0x1234 0000 0000 0000, and the UE accessing a network means the UE accessing a mobile communication network. When an ASR-UE (P-GW) is attached, a subnet prefix allocated by the ASR-UE to the UE is 0xAAAA 0000 0000 0000, while a RID allocated by the network to the UE is 0xBBBB 0000 0000 0000. At this time, if the UE uses an AID of its own as an interface identifier of the IPv6 address of its own, the IPv6 address of the UE is 0x AAAA 0000 0000 0000 1234 0000 0000 0000 (i.e., a subnet prefix plus an interface identifier).

When the CN transmits the IPv6 data packet to the UE, the CN needs to fill in the destination address of the packet, for example with 0x CCCC 0000 0000 0000 1234 0000 0000 0000, i.e., the subnet prefix part may be randomly filled, while the interface ID part must be filled with the AID of the UE.

When the ASR-CN receives the above packet, the ASR-CN needs to inquire the RID of the UE according to the AID of the UE from the ILR. At this time, the ASR-CN knows that the RID of the UE is 0xBBBB 0000 0000 0000. The ASR-CN substitutes the destination address of the above IPv6 data packet with 0x BBBB 0000 0000 0000 1234 0000 0000 0000 (i.e., a RID plus an AID of the UE). According to the subnet prefix of the address, the IPv6 routing mechanism can ensure that the data packet is routed on the above ASR-UE.

The ASR-UE then checks the IPv6 data packet, and if it finds that subnet prefix of the destination address thereof (i.e., the RID of the UE) is not a subnet prefix allocated to the UE when the UE accesses the network, it substitutes the destination address of the packet with 0x AAAA 0000 0000 0000 1234 0000 0000 0000 again, and finally transmits the data packet to the UE. If the UE finds that the IPv6 address of its own is equal to the destination address of the packet, the UE receives and processes the packet. Thus, in a process of transmitting the above IPv6 data packet from the CN to the UE, the interface ID part of the destination address thereof (the AID of the UE) is always unchanged.

Specifically, the ASR-UE transmits the packet to the UE through a radio access network, for example, through a network element such as a S-GW, an eNodeB etc.

With the above method, the mobility management based on the identity and location separation principle can be achieved without using the mode of channeling encapsulation. Thus, it can solve the above problem of resource consumption of the backbone network.

It can be seen from the above example that if the AID of the UE is the interface ID part of the IPv6 address (for example, the last 64 bits), the interface ID part of the IPv6 address of the UE must be fixed and unique. How to acquire the AID by the UE will be described below by several embodiments.

It should be pointed out that, the above description is a process of transmitting a packet from a CN to a UE, and actually, a process of transmitting an IPv6 data packet from a UE to a CN is similar, with an exception that the CN and the UE in the above process are interchanged with each other. The principle is the same, and will be omitted here.

In order to make the purpose, technical schemes and advantages of the patent document clearer and more apparent, the embodiments of the present invention will be illustrated in detail hereinafter in conjunction with accompanying drawings. It should be illustrated that, in the case of no conflict, the embodiments of this application and the features in the embodiments could be combined randomly with each other.

Embodiment One

Figure 5:
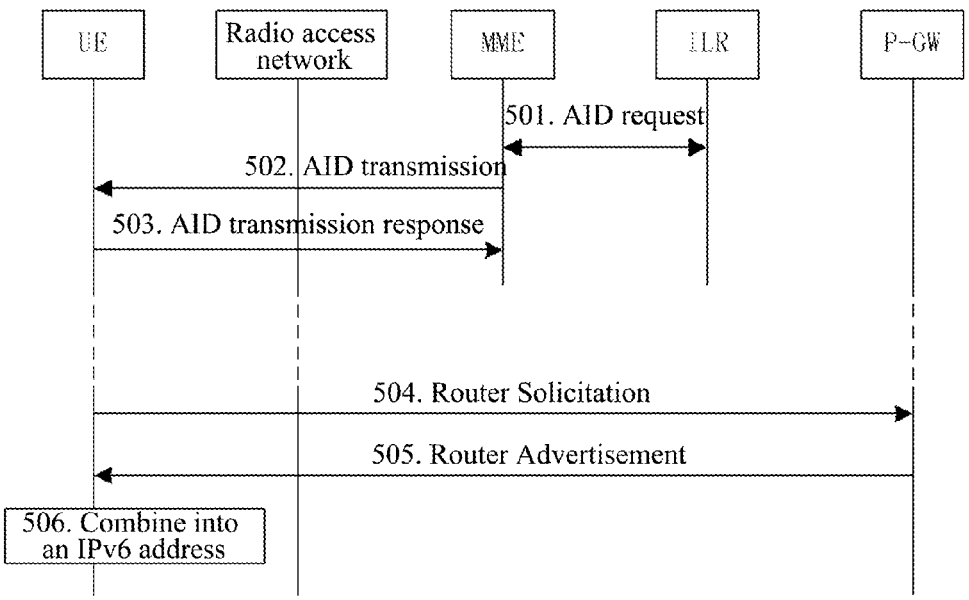
FIG. 5 is a flowchart of a first embodiment of the present invention.

The present embodiment provides a method of configuring an access identifier AID of a UE for the UE when establishing a bearer for the UE in an EPS network. As shown in FIG. 5, the method specifically comprises the following steps.

In step 501, an MME firstly acquires an AID of the UE from an ILR before the MME initiates establishing a bearer for the UE, for example, establishing a default bearer.

The MME may actively initiate establishing a bearer for the UE, or may trigger establishment of a bearer for the UE based on other conditions, which is not focused by the patent document, and should not constitute a limitation on the patent document.

The MME acquires the AID of the UE from the ILR. Specifically, the MME transmits a request message to the ILR, wherein, the request message carries an identifier for authentication and authorization by of UE, for example an IMSI; and the ILR finds the AID of the UE locally based on the above identifier, and returns the AID of the UE to the MME.

As described above, if the AID of the terminal user is designated by subscription thereof, when the user subscribes with an operator, the operator may allocate an AID to the user and stores the AID in an ILR. Of course, the AID may also be stored in an authentication and authorization server, such as an Authentication, Authorization and Accounting (AAA for short) server, a Home Subscriber Server (HSS) or a Home Location Register (HLR) etc. At this time or when the UE is attached, the MME may acquire the AID from the authentication and authorization server (for example, the MME acquires the AID when acquiring subscription information of the UE).

It should be pointed out that the AID described in the present embodiment is not a complete IPv6 address, but an interface identifier part of the IPv6 address, for example, the last 64 bits of a 128-bit IPv6 address. In addition, the interface identifier is a global unique identifier, i.e., one interface identifier will not be allocated to two UEs for use.

In step 502, the MME transmits a message to the UE, wherein, the message carries the AID of the UE acquired above;

It should be pointed out that when a terminal user subscribes with an operator, if there are multiple AIDs which are subscribed, in step 501, the MME may acquire the multiple AIDs of the user, and in this step, these AIDs may be transmitted together to the UE.

Specifically, the MME may carry the above AID of the UE in an activate default EPS bearer context request message to be transmitted to the UE, and preferably, an indication is further carried to inform the UE that the parameter is the AID of the UE.

In step 503, after the above message is received, the UE locally stores the (one or more) AIDs carried therein, and makes them as an access identifier AID of the UE itself, and at the same time, the UE returns a response message such as an activate default EPS bearer context accept message to the MME as an acknowledgement;

in step 504, at any subsequent moment, when the UE wants to acquire an IP address of its own, the UE will transmit a router solicitation message to a P-GW serving the UE currently;

in step 505, based on the above router solicitation message, the P-GW transmits a router advertisement message to the UE, wherein, the router advertisement message carries a subnet prefix of an IPv6 address allocated by the P-GW to the UE;

It should be pointed out that the router advertisement message may also be transmitted by the P-GW to the UE actively instead of depending on the received router solicitation message transmitted by the UE.

In addition, in this step, the P-GW may also allocate a RID to the UE, which may be a subnet prefix part of the IPv6 as described above. The P-GW may carry the RID in the above router advertisement message to be transmitted to the UE. Of course, the P-GW may also transmit to the UE a subnet prefix different from the RID allocated by itself to the UE.

In step 506, it can be known from the above step that if the UE acquires the AID of its own and the subnet prefix allocated by the P-GW at the same time, the UE may combine the two parts of information (for example, according to the mode illustrated in FIG. 3) into one or more complete IPv6 addresses, and interface identifier parts (for example, the last 64 bits) of this (these) IPv6(s) are the AIDs of the UE;

When considering a specific EPS network, it should be pointed out that in step 502, a PDN address field of the above activate default EPS bearer context request message may be extended to add the above AID and indication therein; or a new field may be added in the activate default EPS bearer context request message to carry the above AID and indication.

The above embodiment ensures that the interface identifier part of the IPv6 address thereof is the AID of the UE when the UE generates the IPv6 address of its own.

Embodiment Two

Figure 6:
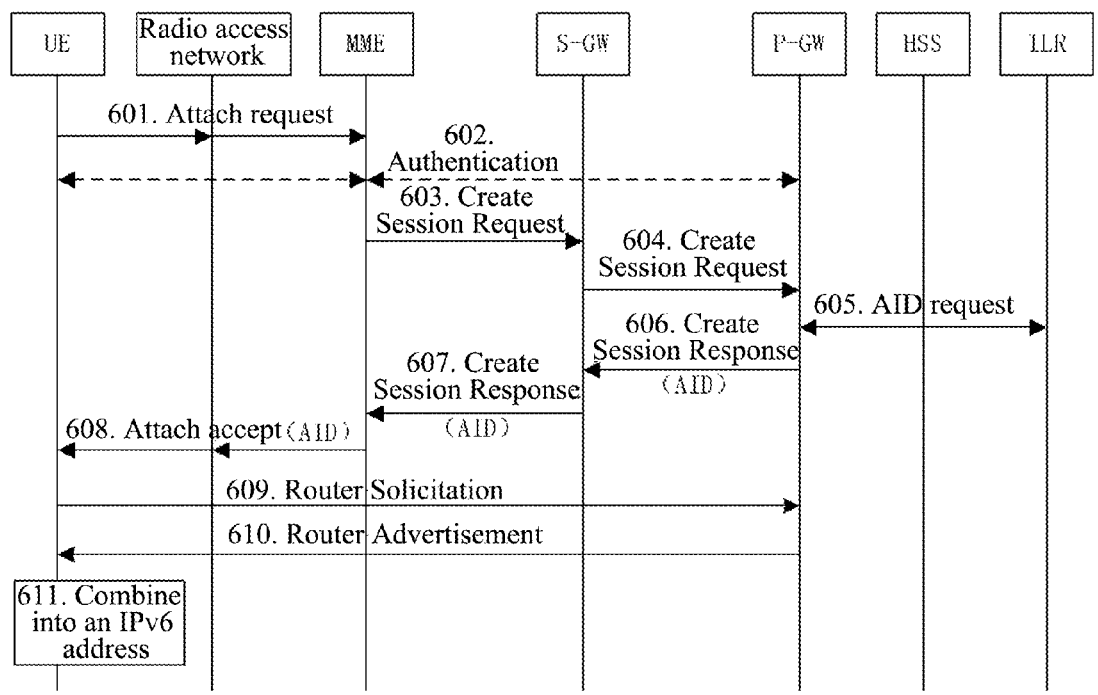
FIG. 6 is a flowchart of a second embodiment of the present invention.

The present embodiment is another method of configuring an access identifier AID of a terminal UE for the UE in a process of being to which the UE is attached in an EPS. As shown in FIG. 6, the method specifically comprises the following steps.

In step 601, the UE initiates an initial attach procedure by transmitting an attach request message to an MME through a radio access network;

in step 602, alternatively, the UE performs an authorization process with the MME and the HSS;

in step 603, the MME transmits a Create Session Request message to a S-GW;

in step 604, the S-GW transmits the Create Session Request message to the P-GW, and after receiving the message, the P-GW creates a session for the UE, for example, creating a PDN context for the UE;

in step 605, the P-GW also acquires the AID of the UE, for example, the P-GW transmits a request to the ILR, wherein, the request carriers an identifier for authentication and authorization of the UE (such as an IMSI), and the ILR returns the AID of the UE to the P-GW;

preferably, if multiple AIDs of the UE are stored in the ILR, the ILR returns the multiple AIDs of the UE to the P-GW. As described above, the P-GW may also acquire the AID of the UE from an authentication and authorization server (such as the AAA, HSS or HLR etc.).

in step 606, the P-GW returns a Create Session Response message to the S-GW, wherein, the Create Session Response message carries one or more AIDs of the UE acquired above, and preferably, further carries an indication to indicate that it is the AID of the UE. The AID of the UE described here is in interface identifier part of the IPv6 address (for example the last 64 bits of the IPv6 address) in form;

Preferably, a PDN address allocation field in the above Create Session Response message may be extended to carry the above AID of the UE and indication; alternatively, a new field is added in the Create Session Response message to carry the AID of the UE.

In step 607, the S-GW returns a Create Session Response message to the MME. As described in the above method, the S-GW transmits the AID of the UE to the MME;

in step 608, the MME transmits an attach accept message to the UE through an access network, wherein, the attach accept message carries the above AID of the UE, and preferably further carries the above indication;

in steps 606-608, after acquiring the AID of the UE, the P-GW may also put it in a Protocol Configuration Option (PCO) parameter to be transmitted to the UE. The parameter is a parameter used to transmit related information between the P-GW and the UE, and this parameter is transparently transmitted for intermediate network elements such as a S-GW, MME etc. The P-GW may put the acquired AID of the UE in the PCO, and firstly transmit the PCO to the S-GW (for example using the above Create Session Response message), and then transmit it to the MME. The UE gets (one or more) AIDs of its own from the PCO after the PCO is transmitted by the MME to the UE, and stores them locally.

Steps 609 to 611 are the same as steps 504 to 506.

As a variation of the method according to the present embodiment, the AID of the UE may also be acquired by the S-GW. For example, when the S-GW receives the Create Session Request message transmitted by the MME or receives the Create Session Response message transmitted by the P-GW, the S-GW requests the AID of the UE from the ILR or the authentication and authorization server. Thus, there is no need for the P-GW to acquire the AID of the UE, and the S-GW only needs to return the AID of the UE carried in the Create Session Response message to the MME in step 607.

As a variation of the method according to the present embodiment, the AID of the UE may also be acquired by the MME. For example, when the MME receives the attach request transmitted by the UE or receives the Create Session Response message transmitted by the S-GW, the MME requests the AID of the UE from the ILR or the authentication and authorization server.

Further, in the above varied methods, after the S-GW or the MME acquires the AID of the UE, it further needs to transmit the AID to the P-GW of the UE. For example, the AID is carried in the Create Session Request to be transmitted to the P-GW. No matter which method of acquiring the AID of the UE is used, the P-GW can acquire the AID of the UE and store it locally.

After the AID of the UE is acquired, it further needs to allocate a RID to the UE. As described above, the RID is a subnet prefix and points to a P-GW to which the UE is attached (for example, the first 64 bits of the IPv6 address). For example, the RID is a subnet prefix part of the IPv6 address of the P-GW itself. Specifically, it comprises the following methods.

In method one, the RID is allocated by the P-GW attached to the UE. For example, after receiving the Create Session Request message in step 604, the P-GW allocates the RID to the UE, or after acquiring the AID of the UE from the ILR in step 605, the P-GW allocates the RID to the UE. Alternatively, as described in the method of step 505, the P-GW allocates the RID to the UE in step 610.

In method two, the RID is allocated by a current S-GW of the UE. For example, when the Create Session Request in step 603 is received, after the P-GW to which the UE is attached is determined (for example, the S-GW selects a P-GW for the UE, or the MME selects a P-GW for the UE and then notifies the selected P-GW to the S-GW), a subnet prefix pointing to the address of the P-GW is used as the RID of the UE. Preferably, a subset prefix of the IPv6 address of the P-GW is used as the RID of the UE. The S-GW may also allocate the RID to the UE when receiving the Create Session Response message in step 606, and at this time, the P-GW to which the UE is attached has been determined.

In method three, the RID is allocated by the current MME of the UE. For example, after the attach request is received (preferably, after the authentication and authorization are passed) and the P-GW to which the UE is attached is determined (for example, the MME selects a P-GW for the UE), a subnet prefix pointing to an address of the P-GW is used as the RID of the UE. Preferably, a subset prefix of the IPv6 address of the P-GW is used as the RID of the UE. The MME may also allocate the RID to the UE after receiving the create session response in step 607, and at this time, the P-GW to which the UE is attached has been determined.

With the above method, after the P-GW, S-GW or MME allocates the RID to the UE, it also needs to notify the RID to the ILR, to make the ILR store a mapping relationship between the AID and the RID of the UE. A message may be transmitted by the P-GW, S-GW or MME to the ILR, wherein, the message carries the RID of the UE, the AID of the UE or an identifier for authentication and authorization of the UE (such as an IMSI). It should be pointed out that notification of RID of the UE to the ILR is not necessarily performed by an entity which allocates the RID of the UE. For example, the RID may be allocated by the MME to the UE, but is notified to the ILR by the P-GW, as long as the MME notifies the allocated RID to the P-GW (for example, through the Create Session Request message in steps 603 and 604). That is, acquisition of the RID and transmission of the RID may be in the same process or in different processes, and the network element for acquiring the RID and the network element for transmitting the RID may be the same or different. Similarly, for the AID, acquisition of the AID and transmission of the AID to the UE by the network side network element may be implemented in the same process or in different processes, and the network element for acquiring the AID and the network element for transmitting the AID to the UE may also be the same or different.

In the above method, after the AID of the UE is acquired, the RID is allocated to the UE and transmitted to the ILR. Actually, before the AID of the UE is acquired, as long as the P-GW to which the UE is attached is determined, the RID can be allocated to the UE. Thus, the allocated RID can be transmitted to the ILR at the same time when the AID of the UE is requested from the ILR.

Embodiment Three

Figure 7:
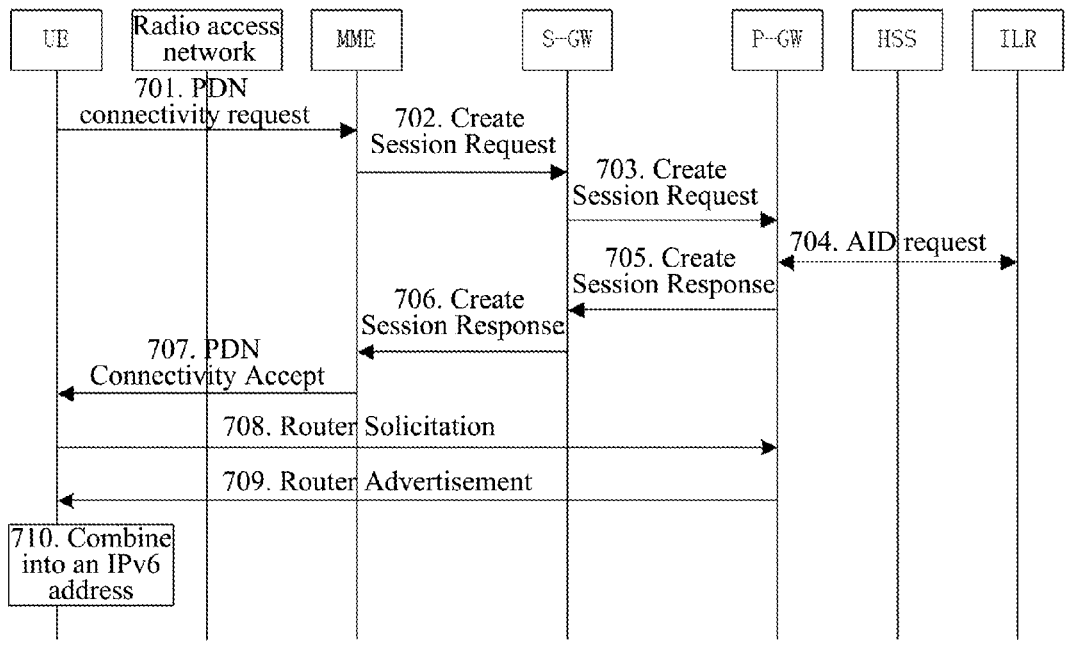
FIG. 7 is a flowchart of a third embodiment of the present invention.

The present embodiment is another method of configuring an access identifier AID of a UE for the UE in an EPS. As shown in FIG. 7, the method specifically comprises the following steps.

In step 701, the UE transmits a PDN connectivity request message to the MME to request a PDN connection;

steps 702 to 706 are the same as steps 603 to 607;

in step 707, the MME transmits a PDN connectivity accept message to the UE, wherein, the PDN connectivity accept message carries an AID of the UE and preferably carries an indication which indicates that the parameter is an AID of the UE;

steps 708 to 710 are the same as steps 504 to 506.

Embodiment Four

Figure 8:
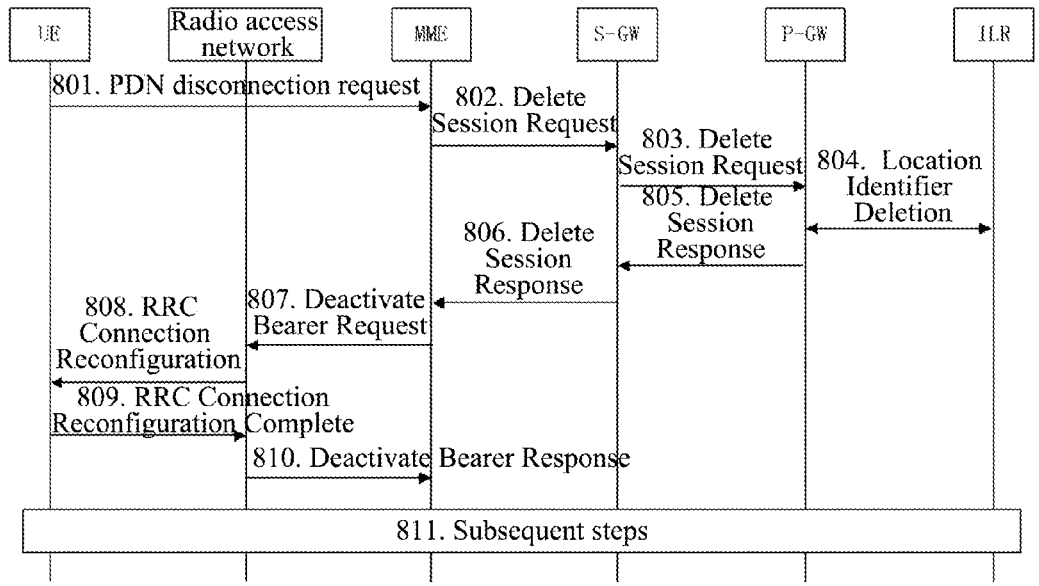
FIG. 8 is a flowchart of a fourth embodiment of the present invention.

The present embodiment describes a method of deleting a RID. When a UE releases an IP address thereof, it needs to delete a routing identifier RID of the UE stored by an ILR. As shown in FIG. 8, the method specifically comprises the following steps.

In step 801, when the UE is to disconnect a PDN connection thereof, the UE transmits a PDN disconnection request message to an MME;

in step 802, the MME transmits a session deletion request message to a S-GW;

The present procedure may be performed starting from this step, which corresponds to a scenario of disconnecting the PDN connection initiated by the MME.

In step 803, the S-GW transmits the session deletion request message to a P-GW;

in step 804, the P-GW transmits a location identifier deletion message to the ILR, wherein, the location identifier deletion message carries a RID of the UE and an identifier for authentication and authorization of the UE (such as an IMSI) or an AID of the UE;

Preferably, if there are multiple active PDN connections for the UE, when the P-GW can judge that the above message is transmitted to the identity location register only when the UE deletes the last active PDN connection.

In step 805, the P-GW returns a delete session response message to the S-GW;

in step 806, the S-GW returns the delete session response message to the MME;

in steps 807 to 810, the MME transmits a deactivate bearer request message to a radio access network (such as a base station); the radio access network transmits a RRC connection reconfiguration message to the UE; the UE returns a RRC connection reconfiguration complete response to the radio access network; and the radio access network returns a deactivate bearer response to the MME.

Step 811 is a subsequent step after the PDN connection is deleted.

Of course, as a variation of the method according to the present embodiment, the MME and the S-GW may also initiate a request from the ILR in a process to delete the RID of the UE stored by the ILR. For example, when the MME receives a PDN disconnection request in step 801, receives a delete session response in step 806 or receives a deactivate bearer response in step 810, the MME initiates a request from the ILR, wherein, the request carries an identifier for authentication and authorization of the UE (such as an IMSI), or carries the AID of the UE, and preferably carries the RID of the UE, to delete the RID information of the UE stored by the ILR. As another example, when the S-GW receives the delete session request in step 802 or delete session response in step 805, the S-GW initiates a request from the ILR, wherein, the request carries an identifier for authentication and authorization of the UE (such as an IMSI), or carries the AID of the UE, and preferably carries the RID of the UE, to delete the RID information of the UE stored by the ILR.

It should be emphasized that the method provided by the above various embodiments enables the network side network element (such as the P-GW, S-GW, MME) to transmit the AID of the UE to UE, wherein, the AID of the UE is an interface ID part in the IPv6 address. Based on the above principle, as a variation, a part of the interface identifier of the above IPv6 address may also be actually used as the AID of the UE. Specifically, in the above embodiments, assume that the interface ID part is the last 64 bits of a complete IPv6 address, and the last 64 bits are used as the AID of the UE. Then in the varied method described here, for example the first 48 bits in the last 64 bits may be used as the AID of the UE. Thus, with the above method according to the present embodiment, the network side may similarly transmit the AID of the UE to the UE, and merely the AID is a part of the interface ID part of the IPv6 address. When the UE configures the IPv6 address of its own, in addition to needing to acquire the subset prefix of its own from the P-GW, it also needs to generate an interface ID. At this time, as the UE has obtained the AID of its own, which is a part of the interface ID, the UE only needs to generate the other part of the interface ID (which is generated randomly for example). For example, in the above example, if the AID has 48 bits, the UE randomly generates a 16-bit digit, which constitutes a 64-bit interface ID with the AID.

It is well known that in the existing EPS related 3rd Generation Partnership Project (3GPP) specifications, a general mode of the UE acquiring an IPv6 address of its own is that the P-GW notifies a 64-bit subnet prefix of an IPv6 to the UE, and the interface ID part of the last 64 bits is configured by the UE itself to constitute a complete IPv6 address. That is, the interface ID part of the IPv6 of the UE is not designated by the network.

But even if the mobility management technology based on the identity and location separation principle is not applied in the EPS, when the EPS needs to designate an interface ID used by the UE for the UE, it can still be implemented by using the method in the above embodiment. But the interface ID here does not have the meaning of the above identity identifier, and there is no need to deploy the ILR.

In this case, the network side (such as the MME, P-GW, S-GW as described above) also needs not to acquire an interface identifier of the UE from the ILR, and the interface ID needed to be allocated to the UE merely needs to be allocated locally or acquired from subscription information of the UE, and the interface identifier is transmitted to the UE using the above method of transmitting the AID of the UE to the UE. Thus, the purpose of allocating a determined IPv6 address by the EPS for the UE can be achieved.

Embodiment Five

Figure 9:
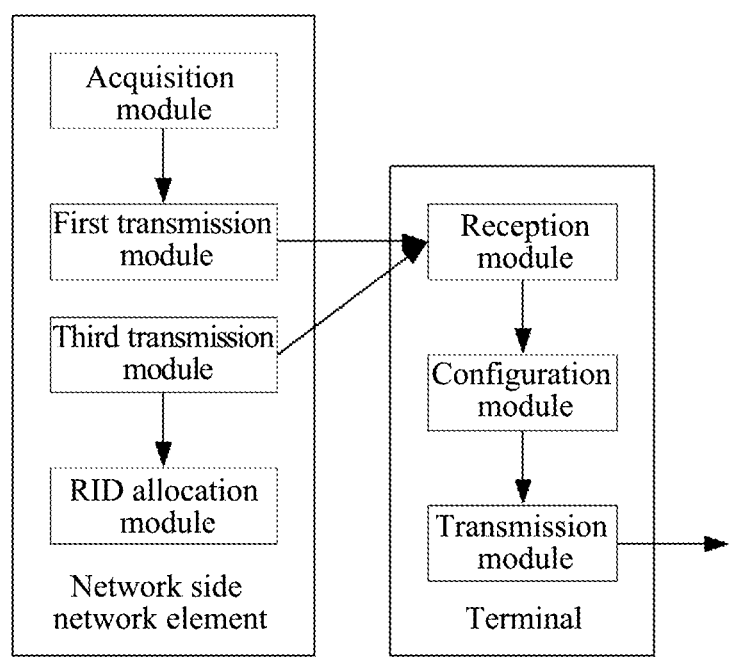
FIG. 9 is a structural diagram of a fifth embodiment of the present invention.

The present embodiment provides an EPS network side network element for implementing the above method, as shown in FIG. 9, which comprises an acquisition module and a first transmission module, wherein, the acquisition module is configured to acquire an AID of a UE; and the first transmission module is configured to transmit the AID acquired by the acquisition module to the UE.

Preferably, the EPS network side network element comprises any one of an MME, a P-GW and a S-GW.

When the EPS network side network element is a P-GW to which the UE is attached, the P-GW further comprises a subnet prefix allocation module and a second transmission module, wherein, the subnet prefix allocation module is configured to allocate a subnet prefix for the UE, and the second transmission module is configured to transmit the subnet prefix allocated by the allocation module to the UE.

Preferably, when the EPS network side network element is a P-GW to which the UE is attached, the P-GW further comprises a substitution module, configured to after receiving the data packet transmitted by the UE, inquire to obtain a RID of a CN of the UE, and after the subnet prefix part of the destination address of the data packet is substituted with the RID, transmit the data packet to an IP network. Preferably, when the subnet prefix of the destination address of the data packet transmitted to the UE is different from the prefix which is previously allocated to the UE, the substitution module is further configured to, when receiving the data packet transmitted to the UE, substitute the subnet prefix of the destination address of the data packet with the subnet prefix allocated by the P-GW to the UE, and transmit the data packet to the UE.

Preferably, the acquisition module is configured to acquire the AID of the UE in the following way: the acquisition module acquiring the AID of the UE by inquiring an ILR or an authentication and authorization server according to an IMSI of the UE; or locally allocating the AID of the UE; or acquiring the AID of the UE from subscription information of the UE.

Specifically, the EPS network side network element is an MME, and the transmission module is configured to transmit the AID acquired by the acquisition module to the UE in the following way: the transmission module transmitting the AID acquired by the acquisition module to the UE in a process of establishing a bearer for the UE or attaching the UE or the UE requesting a PDN connection.

Specifically, the EPS network side network element is a P-GW, and the transmission module is configured to transmit the AID acquired by the acquisition module to the UE in the following way: the transmission module transmitting the AID acquired by the acquisition module to the UE in a process of attaching the UE or the UE requesting a PDN connection.

Specifically, the EPS network side network element is a S-GW, and the transmission module is configured to transmit the AID acquired by the acquisition module to the UE in the following way: the transmission module transmitting the AID acquired by the acquisition module to the UE in a process of attaching the UE or the UE requesting a PDN connection.

Preferably, the EPS network side network element further comprises a RID allocation module and a third transmission module, wherein, the RID allocation module is configured to after the network element determines the P-GW to which the UE is attached, allocate a RID for the UE, wherein, the RID is a subnet prefix of an IPv6 address pointing to the P-GW; and the third transmission module is configured to transmit the RID of the UE to the ILR which stores a mapping relationship between the AID and the RID of the UE.

Embodiment Six

A UE for implementing the above method, as shown in FIG. 9, comprises a reception module and a configuration module, wherein, the reception module is configured to receive an AID of the UE transmitted by an EPS network side network element and receive a subnet prefix allocated by a P-GW to which the UE is attached; and the configuration module is configured to combine into an IPv6 address using the AID as an interface identifier part of the IPv6 address and the subnet prefix as a subnet prefix part of the IPv6 address, and use the IPv6 address to configure the IPv6 address of the UE itself.

Preferably, the configuration module is configured to use the AID as an interface identifier part of an IPv6 address in the following way:

using the AID as a part of the interface identifier part of an IPv6 address, generating the other part of the interface identifier part, and combining the two parts into the interface identifier part of the IPv6 address.

Preferably, the UE further comprises a transmission module, configured to use the combined IPv6 address as a source address of the data packet and use the AID of a CN as an interface identifier part of a destination address of the data packet when the UE transmits a data packet to the CN.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, various modules/units in the above embodiments can be implemented in a form of hardware, or can also be implemented in a form of software functional module. The patent document is not limited to any particular form of a combination of hardware and software.

Of course, the patent document can have a plurality of other embodiments. Without departing from the spirit and substance of the patent document, those skilled in the art can make various corresponding changes and variations according to the patent document, and all these corresponding changes and variations should belong to the protection scope of the appended claims in the patent document.

INDUSTRIAL APPLICABILITY

With the method, network element or UE according to the embodiments of the present invention, when data is transmitted between the UE and a CN, there is no need to perform tunneling encapsulation on the data packet, which reduces the resource consumption of the backbone network and reduces the cost of the backbone network.

What is claimed is:

1. A method of achieving an identity and location separation network, which is suitable to be applied in an Evolved Packet System (EPS) network of an identity and location separation technology, the method comprising:
    an EPS network side network element acquiring an Access Identifier (AID) of a User Equipment (UE), and transmitting the acquired AID to the UE;
    a Packet Data Network Gateway (P-GW) to which the UE is attached allocating a subnet prefix for the UE, and transmitting the subnet prefix to the UE; and
    the UE combining into an IPv6 address by using the AID as an interface identifier part of the IPv6 address and the subnet prefix as a subnet prefix part of the IPv6 address, and using the IPv6 address to configure the IPv6 address of the UE;
    the method further comprising: when the UE transmits a data packet to a Correspondent Node (CN), using the combined IPv6 address as a source address of the data packet, and using the AID of the CN as the interface identifier part of a destination address of the data packet; and
    after the P-GW to which the UE is attached receives the data packet transmitted by the UE, inquiring to obtain a Routing Identifier (RID) of the CN, and after the subnet prefix part of the destination address of the data packet is substituted with the RID, transmitting the data packet to an IP network.

2. The method according to claim 1, wherein,
    the EPS network side network element acquiring an AID of a UE comprises:
    the EPS network side network element acquiring the AID of the UE by inquiring an Identity Location Register (ILR) or an authentication and authorization server according to an International Mobile Subscriber Identification Number (IMSI) of the UE.

3. The method according to claim 2, wherein,
    the authentication and authorization server comprises any one of an Authentication, Authorization and Accounting (AAA) server, a home location register and a home subscriber server.

4. The method according to claim 1, wherein,
    the EPS network side network element comprises any one of a Mobility Management Entity (MME), a P-GW and a Serving Gateway (S-GW).

5. The method according to claim 1, wherein,
the EPS network side network element is a Mobility Management Entity (MME), and the MME transmitting the acquired AID to the UE comprises:
the MME transmitting the acquired AID to the UE in a process of establishing a bearer for the UE or attaching the UE or the UE requesting a PDN connection.

6. The method according to claim 5, wherein,
the MME transmitting the acquired AID to the UE in a process of establishing a bearer for the UE comprises:
in a process of establishing a bearer for the UE, the MME carrying the AID of the UE, acquired by the MME inquiring an ILR or an authentication and authorization server according to an IMSI of the UE before establishing a bearer for a terminal, in an activate default EPS bearer context request message to be transmitted to the UE;
or
the MME transmitting the acquired AID to the UE in a process of attaching the UE comprises:
when an Attach Request transmitted by the UE or a Create Session Response message returned by a Serving Gateway (S-GW) is received, acquiring the AID of the UE by inquiring an ILR or an authentication and authorization server according to an IMSI of the UE, and carrying the acquired AID of the UE in an Attach Accept message to be transmitted to the UE;
or
the MME transmitting the acquired AID to the UE in a process of the UE requesting a PDN connection comprises:
when the MME receives a PDN Connectivity Request message transmitted by the UE or a Create Session Response message returned by a S-GW, acquiring the AID of the UE by inquiring an ILR or an authentication and authorization server according to an IMSI of the UE, and carrying the acquired AID of the UE in a PDN Connectivity Accept message to be transmitted to the UE.

7. The method according to claim 1, wherein,
the EPS network side network element is the P-GW, and the P-GW transmitting the acquired AID to the UE comprises:
the P-GW transmitting the acquired AID to the UE in a process of attaching the UE or the UE requesting a PDN connection;
or
the EPS network side network element is the P-GW, and the EPS network side network element acquiring the AID of the UE and transmitting the acquired AID to the UE comprises:
in a process of attaching the UE or the UE requesting a PDN connection, when the P-GW receives a Create Session Request message, acquiring the AID of the UE by inquiring an ILR or an authentication and authorization server according to an IMSI of the UE, and carrying the AID of the UE in a Create Session Response message returned to a S-GW and transmitting the AID to the UE through the S-GW and MME;
or
the network side network element is a S-GW, and the S-GW transmitting the acquired AID to the UE comprises:
in a process of attaching the UE or the UE requesting a PDN connection, the S-GW transmitting the acquired AID to the UE;
or
the EPS network side network element is a S-GW, and the EPS network side network element acquiring the AID of the UE and transmitting the acquired AID to the UE comprises:
in a process of attaching the UE or the UE requesting a PDN connection, when the S-GW receives a Create Session Request message transmitted by MME or a Create Session Response message transmitted by the P-GW, acquiring the AID of the UE by inquiring an ILR or an authentication and authorization server according to an IMSI of the UE, and carrying the AID of the UE in a Create Session Response message returned to the MME and transmitting the AID to the UE through the MME.

8. The method according to claim 1, further comprising:
after determining the P-GW to which the UE is attached, the EPS network side network element allocating a Routing Identifier (RID) for the UE, wherein, the RID is a subnet prefix of an IPv6 address pointing to the P-GW; and the EPS network side network element transmitting the RID of the UE to an ILR which stores a mapping relationship between the AID and the RID of the UE.

9. The method according to claim 1, wherein,
the UE using the AID as an interface identifier part of an IPv6 address comprises:
the UE using the AID as a part of the interface identifier part of an IPv6 address, generating another part of the interface identifier part, and combining the two parts into the interface identifier part of the IPv6 address.

10. An Evolved Packet System (EPS) network side network element, comprising a processor, a storage device and a plurality of modules in the storage device, the modules comprising an acquisition module and a first transmission module, wherein,
the acquisition module is configured to acquire an Access Identifier (AID) of a User Equipment (UE); and
the first transmission module is configured to transmit the AID acquired by the acquisition module to the UE;
wherein when the EPS network side network element is a P-GW to which the UE is attached, the P-GW further comprises a subnet prefix allocation module, a second transmission module and a substitution module, wherein,
the subnet prefix allocation module is configured to allocate a subnet prefix for the UE; and
the second transmission module is configured to transmit the subnet prefix allocated by the subnet prefix allocation module to the UE;
the substitution module is configured to: after receiving a data packet transmitted by the UE, inquire to obtain a Routing Identifier (RID) of a Correspondent Node (CN) of the UE, and after a subnet prefix part of a destination address of the data packet is substituted with the RID, transmit the data packet to an IP network.

11. The network element according to claim 10, wherein,
the EPS network side network element further comprises any one of a Mobility Management Entity (MME) and a Serving Gateway (S-GW).

12. The network element according to claim 10, wherein,
the substitution module is further configured to, when receiving a data packet transmitted to the UE, substitute a subnet prefix of a destination address of the data packet with the subnet prefix allocated by the P-GW to the UE, and transmit the data packet to the UE.

13. The network element according to claim 10, wherein,
the acquisition module is configured to acquire the AID of the UE by using the following mode:
the acquisition module acquiring the AID of the UE by inquiring an Identity Location Register (ILR) or an authentication and authorization server according to an International Mobile Subscriber Identification Number (IMSI) of the UE; or
locally allocating the AID of the UE; or
acquiring the AID of the UE from subscription information of the UE.

14. The network element according to claim 10, wherein,
the EPS network side network element is a Mobility Management Entity (MME), and the transmission module is configured to transmit the AID acquired by the acquisition module to the UE by using the following mode:
the transmission module transmitting the AID acquired by the acquisition module to the UE in a process of establishing a bearer for the UE or attaching the UE or the UE requesting a PDN connection;
or
the EPS network side network element is a P-GW, and the transmission module is configured to transmit the AID acquired by the acquisition module to the UE by using the following mode:
the transmission module transmitting the AID acquired by the acquisition module to the UE in a process of attaching the UE or the UE requesting a PDN connection;
or
the EPS network side network element is a S-GW, and the transmission module is configured to transmit the AID acquired by the acquisition module to the UE by using the following mode:
the transmission module transmitting the AID acquired by the acquisition module to the UE in a process of attaching the UE or the UE requesting a PDN connection.

15. The method according to claim 1, the method further comprises: when the P-GW to which the UE is attached receives a data packet transmitted to the UE, the P-GW substituting a subnet prefix of a destination address of the data packet with the subnet prefix allocated by the P-GW to the UE, and transmitting the data packet to the UE.

16. The method according to claim 1, further comprising: the Packet Data Network Gateway (P-GW) to which the UE is attached allocating the subnet prefix for the UE comprises: the P-GW allocating the RID, allocated by the EPS network side network element to the UE, as the subnet prefix to the UE.

17. The network element according to claim 10, wherein the EPS network side network element further comprises a Routing Identifier (RID) allocation module and a third transmission module, wherein,
the RID allocation module is configured to: after the network element determines a P-GW to which the UE is attached, allocate a RID for the UE, wherein, the RID is a subnet prefix of an IPv6 address pointing to the P-GW; and
the third transmission module is configured to transmit the RID of the UE to an ILR which stores a mapping relationship between the AID and the RID of the UE.

* * * * *